(12) United States Patent
Sun et al.

(10) Patent No.: US 11,487,795 B2
(45) Date of Patent: Nov. 1, 2022

(54) TEMPLATE-BASED AUTOMATIC SOFTWARE BUG QUESTION AND ANSWER METHOD

(71) Applicant: YANGZHOU UNIVERSITY, Jiangsu (CN)

(72) Inventors: Xiaobing Sun, Jiangsu (CN); Jinting Lu, Jiangsu (CN); Bin Li, Jiangsu (CN)

(73) Assignee: YANGZHOU UNIVERSITY

( * ) Notice: Subject to any disclaimer, the term of this patent is extended or adjusted under 35 U.S.C. 154(b) by 0 days.

(21) Appl. No.: 17/421,211

(22) PCT Filed: Aug. 28, 2019

(86) PCT No.: PCT/CN2019/102929
§ 371 (c)(1),
(2) Date: Jul. 7, 2021

(87) PCT Pub. No.: WO2020/168702
PCT Pub. Date: Aug. 27, 2020

(65) Prior Publication Data
US 2022/0043845 A1    Feb. 10, 2022

(30) Foreign Application Priority Data

Feb. 21, 2019    (CN) .......................... 201910130114.0

(51) Int. Cl.
*G06F 40/30*    (2020.01)
*G06F 16/332*    (2019.01)
(Continued)

(52) U.S. Cl.
CPC ...... *G06F 16/3329* (2019.01); *G06F 16/3344* (2019.01); *G06F 40/295* (2020.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS

| | | | |
|---|---|---|---|
| 9,244,510 B1 | 1/2016 | Conrad et al. | |
| 9,558,265 B1* | 1/2017 | Tacchi | G06F 16/338 |
| 9,710,544 B1* | 7/2017 | Smith | G06F 16/36 |
| 2011/0219360 A1 | 9/2011 | Srinivasa et al. | |
| 2014/0304251 A1* | 10/2014 | Bornea | G06F 16/9024 |
| | | | 707/718 |

(Continued)

FOREIGN PATENT DOCUMENTS

| CN | 105701253 A | 6/2016 |
|---|---|---|
| CN | 108717441 A | 10/2018 |

(Continued)

OTHER PUBLICATIONS

Unger et al., Template-based Question Answering over RDF Data, 2012,Proceedings of the 21st international conference on World Wide Web, pp. ={639-648} (Year: 2012).*

(Continued)

*Primary Examiner* — Lamont M Spooner
(74) *Attorney, Agent, or Firm* — Dentons Cohen & Grigsby P.C.

(57) ABSTRACT

Disclosed is a template-based automatic question and answer method for software bug. An entity relationship triple is extracted from a bug corpus and a natural language pattern is acquired; an entity relationship in the triple is determined; a query template corresponding to the natural language pattern is acquired; an entity in a question q proposed by a user is replaced with an entity type to acquire a question q'; then, the entity type in q' and an entity type in the natural language pattern are compared and searched for and a similarity is calculated; then, a SPARQL query pattern of the question q is acquired according to the similarity and the entity in the question q; and finally, the SPARQL query pattern of the question q is executed so as to acquire an answer to the question q.

10 Claims, 3 Drawing Sheets

(51) Int. Cl.
*G06F 16/33* (2019.01)
*G06F 40/295* (2020.01)

(56) References Cited

U.S. PATENT DOCUMENTS

| | | | | |
|---|---|---|---|---|
| 2018/0060733 | A1* | 3/2018 | Beller | G06N 20/00 |
| 2018/0060734 | A1* | 3/2018 | Beller | G06N 20/00 |
| 2018/0144252 | A1* | 5/2018 | Minervini | G06F 40/30 |
| 2019/0171944 | A1* | 6/2019 | Lu | G06N 20/00 |
| 2020/0257717 | A1* | 8/2020 | Li | G06N 20/10 |
| 2021/0240603 | A1* | 8/2021 | Li | G06F 11/3664 |

FOREIGN PATENT DOCUMENTS

| | | |
|---|---|---|
| CN | 109947914 A | 6/2019 |
| WO | 2020168702 A1 | 8/2020 |

OTHER PUBLICATIONS

Zheng et al., Question Answering Over Knowledge Graphs: Question Understanding Via Template Decomposition, 2018, Proceedings of the VLDB Endowment vol. 11 Issue 11, pp. 1373-1386 (Year: 2018).*
Nie et al., Mention and Entity Description Co-Attention for Entity Disambiguation, 2018,Thirty-second AAAI conference on artificial intelligence, pp. 5908-5915 (Year: 2018).*
Lu, Jinting et al., Interactive Query Reformulation for Source-Code Search With Word Relations, IEEE Access (Dec. 27, 2018), 6:75660-75668.
Sun et al. (2018). Developer Recommendation for Software Security Bugs. Ruan dian Xue Bao/Journal of Software. 29. 2294-2305. 10.13328/j.cnki.jos.005523.
International Search Report from co-pending application PCT/CN2019/102929 (English Translation), dated Nov. 28, 2019.

* cited by examiner

PTG for (v1,v2)

s1: <Person> reported the <BugID>.

s2: <Person> was a reporter of the <BugID>.

S3: <Person> confirmed the <BugID>.

TEMPLATE-BASED AUTOMATIC SOFTWARE BUG QUESTION AND ANSWER METHOD

CROSS-REFERENCE TO RELATED APPLICATIONS

This is a national stage application filed under 37 U.S.C. 371 based on International Patent Application No. PCT/CN2019/102929, filed Aug. 28, 2019, which claims priority to Chinese Patent Application No. 201910130114.0 filed Feb. 21, 2019, the disclosures of which are incorporated herein by reference in their entireties.

TECHNICAL FIELD

The present disclosure belongs to the field of software maintenance and, in particular, relates to a template-based automatic question and answer method for software bug.

BACKGROUND

In order to solve some new software bugs encountered, software developers and maintainers generally need to use search engines and software bug databases to question and answer about software bugs. However, search engines generally express search requirements based on the logic of the combination of keywords, and search requirements of users are generally complex and special. Therefore, search engines cannot understand users' intentions in detail and accurately, and thus naturally cannot retrieve answers that satisfy users. In addition, since most of the software bug databases adopt a search method based on traditional relational databases, the results obtained by the search contain a large amount of information and attributes of the software bugs which generally have little relevance with the questions that the software developers and maintainers want to know, so that the software developers and maintainers cannot be helped to fix the new software bugs. In addition, the method for searching the software bug information in search engines and software bug databases directly adopts a keyword matching technology, so that search space is large, time is greatly consumed, and the search results obtained by only depending on the keyword search are not accurate. Therefore, such a time-consuming and power-consuming question-and-answer manner makes it difficult for searchers to find the information they really need.

SUMMARY

The present disclosure provides an automatic question and answer method for software bug which may well understand bug questions raised by software developers and maintainers and is high in answer efficiency.

The solution to achieve the objective of the present disclosure is: a template-based automatic question and answer method for software bug. The method includes the steps described below.

In step 1, an entity relationship triple set E is extracted from a bug report, and a natural language pattern set S, a supported instance set I and a predicate set R are acquired according to the entity relationship triple set E.

In step 2, an entity relationship in the entity relationship triple set E is determined according to the natural language pattern set S acquired in step 1.

In step 3, a query template corresponding to each natural language pattern in the natural language pattern set S is acquired according to the natural language pattern set S and an entity relationship triple.

In step 4, an entity in a question q proposed by a user q is identified in view of, and the entity in q is replaced with an entity type to obtain a question q'.

In step 5, a candidate query pattern of the question q is acquired according to the entity type in the question q' obtained in step 4 and an entity type in the natural language pattern set S obtained in step 1, and a similarity between each candidate query pattern and q' is calculated.

In step 6, a SPARQL query pattern $\lambda(q)$ of the question q is acquired in combination with a SPARQL query language and according to the query template acquired in step 3, the similarity between the each candidate query pattern and q' acquired in step 5 and the entity in the question q.

In step 7, an entity relationship diagram G is constructed from the bug report, and $\lambda(q)$ acquired by executing step 6 is searched in the diagram G so as to obtain an answer to the question q.

Compared with the related art, the present disclosure has significant advantages. 1) The method of the present disclosure adopts a template to understand the question and answer information, so that the accuracy of understanding the software bug information is improved, a foundation is laid for the question and answer, and the accuracy of the automatic question and answer is also enhanced to a certain extent; 2) the method of the present disclosure adopts a natural language pattern based on an entity type to search, which greatly reduces search space and improves the efficiency of query; 3) the method of the present disclosure constructs a text corpus based on the information of software bug databases, and identifies an entity based on an entity type, which improves the accuracy of entity identification and provides a basis for subsequent mutual conversion between entities and entity types; 4) the text corpus and the entity relation diagram adopted by the method of the present disclosure have the same source, namely software bug databases, so that the feasibility of automatic software bug question and answer is enhanced; 5) the method of the present disclosure adopts the template to perform the automatic question and answer, so that response speed is high, and query efficiency is high.

The present disclosure is described below in detail in conjunction with the drawings.

DETAILED DESCRIPTION

Figure 1:
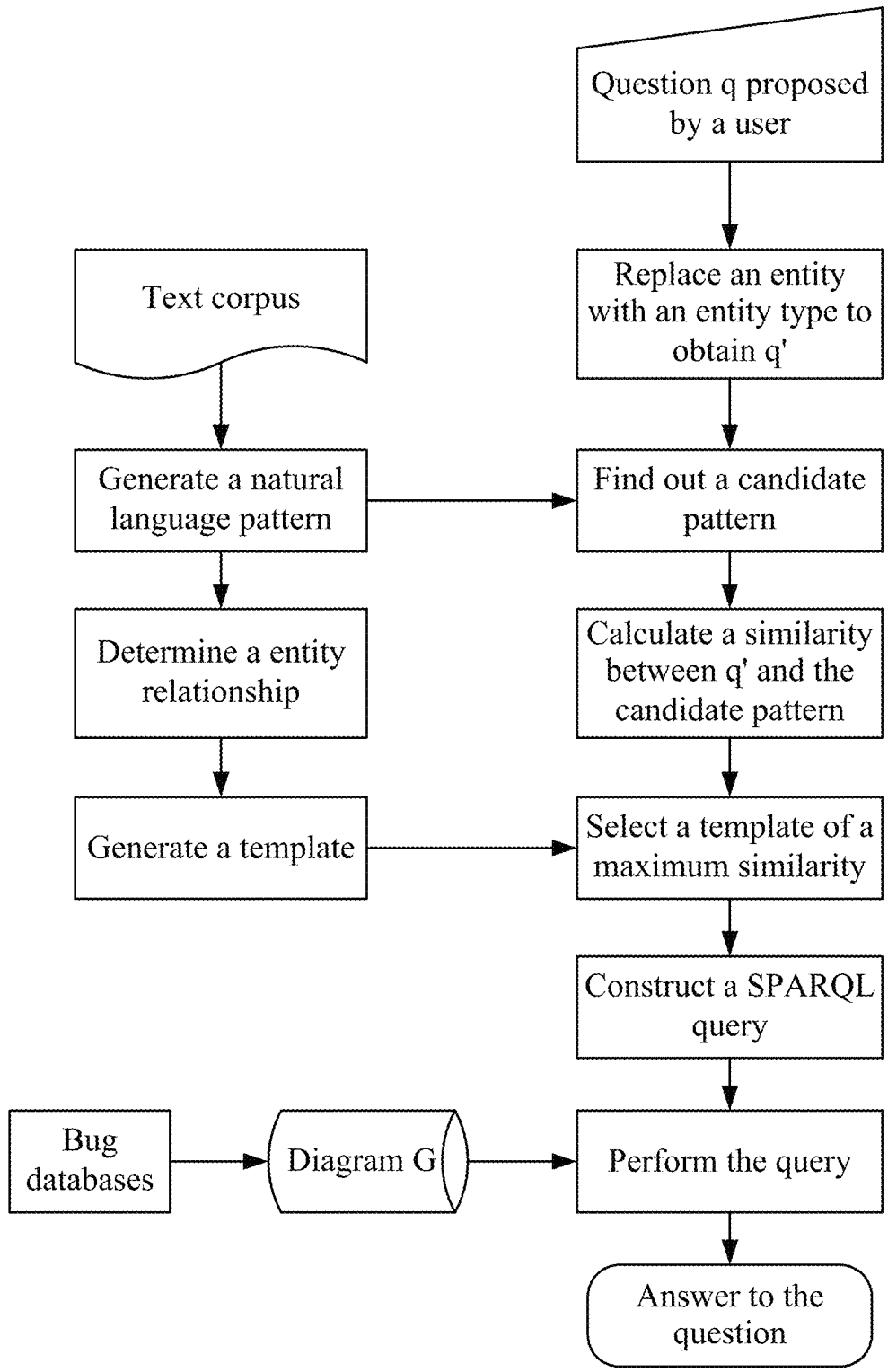
FIG. 1 is a flowchart of a template-based automatic question and answer method for software bug according to the present disclosure.

In combination with FIG. 1, a template-based automatic question and answer method for software bug according to the present disclosure includes steps described below.

In step 1: an entity relationship triple set E is extracted from a bug report, and a natural language pattern set S, a supported instance set I and a predicate set R are acquired according to the entity relationship triple set E.

In step 2, an entity relationship in the entity relationship triple set E is determined according to the natural language pattern set S acquired in step 1.

In step 3, a query template corresponding to each natural language pattern in the natural language pattern set S is acquired according to the natural language pattern set S and an entity relationship triple.

In step 4, an entity in a question q proposed by a user is identified, and the entity in q is replaced with an entity type to acquire a question q'.

In step 5, a candidate query pattern of the question q is acquired according to the entity type in the question q' acquired in step 4 and an entity type in the natural language pattern set S acquired in step 1, and a similarity between each candidate query pattern and q' is calculated.

In step 6, a SPARQL query pattern λ(q) of the question q is acquired in combination with a SPARQL query language and according to the query template acquired in step 3, the similarity between each candidate query pattern and q' acquired in step 5 and the entity in the question q.

In step 7, an entity relationship diagram G is constructed from the bug report, and λ(q) acquired by executing step 6 is searched in the diagram G so as to acquire an answer to the question q.

Further, step 1 in which the entity relationship triple set E is extracted from the bug report, and the natural language pattern set S, the supported instance set I and the predicate set R are acquired according to the entity relationship triple set E includes the steps described below.

In step 1-1, bug attribute information is extracted from the bug report to form a bug text corpus D, and the entity relationship triple set E in D is extracted.

In step 1-2, for each entity relationship triple e in the entity relationship triple set E, candidate mention satisfying each entity relationship triple e is extracted from D. The candidate mention is: a sentence set simultaneously containing two entities of the each entity relationship triple e in the text corpus D.

$$e=<v_1,r,v_2>\in E$$

v1 denotes an entity, v2 denotes an entity, and r denotes a relationship.

In step 1-3, entities in the candidate mention acquired in step 1-2 are replaced with entity types corresponding to the entities so as to acquire a natural language pattern corresponding to each entity relationship triple e. All of natural language patterns form the natural language pattern set S; and an entity refers to a description of a bug attribute, and an entity type refers to a bug attribute.

In step 1-4, all of entities and entity relationships in the text corpus D form the supported instance set I, and all of predicates form the predicate set R. An entity relationship includes a succession relationship and a repetition relationship and is embodied by a predicate, such as a modal verb, an auxiliary verbs, a be verb, etc.

In an embodiment, the bug attribute information in step 1-1 includes: BugID information, Product information, Component information, Reported information, Modified information, Assignee information, Reporter information, QA Contact information, Summary information, and Description information.

Further, step 2 in which the entity relationship in the entity relationship triple set E is determined according to the natural language pattern set S acquired in step 1 includes the steps described below.

step 2-1: a pattern tripartite graph consisting of the supported instance set I, the natural language pattern set S and the predicate set R is constructed. In an embodiment, for any natural language pattern s that satisfies s∈S, in a case where $(v_1, v_2)$ being a supported instance of s exists, an edge between $(v_1, v_2)$ and s exists; and for any predicate r that satisfies r∈R, in a case where r being a relationship between two entities in the supported instance of the natural language pattern s exists, an edge exists between s and r.

In step 2-2: a similarity between each element s and each element r in R is calculated according to the pattern tripartite graph and in combination with a similarity measurement method and in view of each element s in the natural language pattern set S, and r corresponding to a maximum similarity value is configured as an entity relationship of s. A set formed by all of entity relationships is the entity relationship in the entity relationship triple set E.

Further, step 3 in which the query template corresponding to each natural language pattern in the natural language pattern set S is acquired according to the natural language pattern set S and the entity relationship triple includes the steps described below.

For each natural language pattern in the natural language pattern set S, the steps described below are included.

In step 3-1, a question word wh- corresponding to each entity is determined according to an entity type of each natural language pattern.

In step 3-2, how to process a corresponding entity is determined according to the question word determined by step 3-1. In a case where the determined question word is "which", the entity type is moved after "which"; otherwise, the entity type is deleted.

In step 3-3, an auxiliary verb or a modal verb is added according to a main body in a sentence corresponding to each natural language pattern so as to acquire a complete question sentence marked as a question pattern.

In step 3-4, the entity relationship triple $<v_1, r, v_2>$ is parameterized, and the SPARQL query pattern, namely the query template corresponding to each natural language pattern, is generated from the question pattern and the parameterized entity relationship triple by using the SPARQL query language.

In an embodiment, step 3-4 in which the entity relationship triple $<v_1, r, v_2>$ is parameterized includes: an entity in the triple is replaced with an entity type.

Further, step 4 in which the entity in the question q proposed by the user is identified includes: the entity is identified based on the entity type and by using a long short-term memory (LSTM) neural network.

Further, step 5 in which the candidate query pattern of the question q is acquired according to the entity type in the question q' acquired in step 4 and the entity type in the natural language pattern set S acquired in step 1, and the similarity between each candidate query pattern and q' is calculated includes the steps described below.

In step 5-1, whether a bijection relationship exists between the entity type in the question q' and an entity type in a natural language pattern in the natural language pattern set S is determined. In a case where the bijective relation exists, the natural language pattern is one candidate query pattern of the question q.

In step 5-2, for all candidate query patterns of the question q, the similarity between the each candidate query pattern and q' by is calculated by using a Jaccard similarity coefficient.

The Jaccard similarity coefficient is used to compare similarities and differences between finite sample sets. The greater the Jaccard coefficient value, the higher the sample similarity. Two samples A and B are given, and the Jaccard coefficient is defined as the ratio of the size of the intersection of A and B to the size of the union of A and B, as follows:

$$J(A, B) = \frac{|A \cap B|}{|A \cup B|} = \frac{|A \cap B|}{|A| + |B| - |A \cap B|}.$$

Further, step 6 in which the SPARQL query pattern λ(q) of the question q is acquired in combination with the SPARQL query language and according to the query template acquired in step 3, the similarity between each candidate query pattern and q' acquired in step 5 and the entity in the question q includes the steps described below.

In step 6-1, values of similarities between candidate query patterns and the question q' obtained in step 5 are put in descending order, and a query template of a candidate query pattern corresponding to a maximum similarity is selected.

In step 6-2, the SPARQL query pattern is instantiated through the entity in the question q, and the SPARQL query pattern λ(q) corresponding to the question q is acquired in combination with the query template selected in step 6-1.

Further, step 7 in which the entity relationship diagram G is constructed from the bug report includes: the entity relationship diagram G is constructed through the text corpus D.

Embodiment

In combination with FIG. 1, a template-based automatic software bug question and answer method of the present disclosure includes the content described below.

Figure 2:
FIG. 2 is a schematic view of a bug report for bug 59908 according to an embodiment of the present disclosure.

(1) In combination with FIG. 2, in the embodiment, the bug report of bug 59908 is taken as an example, and BugID information, Product information, Component information, Reported information, Modified information, Assignee information, Reporter information, QA Contact information, Summary information and Description information in the bug report are extracted to obtain a text corpus D. Two sentences, hixie reported the bug 59908 and Hixie confirmed the bug 59908, in the text corpus D are taken as examples. Entities in the two sentences are replaced with entity types, and corresponding natural language patterns are generated as follows:

<Person> reported the <BugID> and <Person> confirmed the <BugID>.

Figure 3:
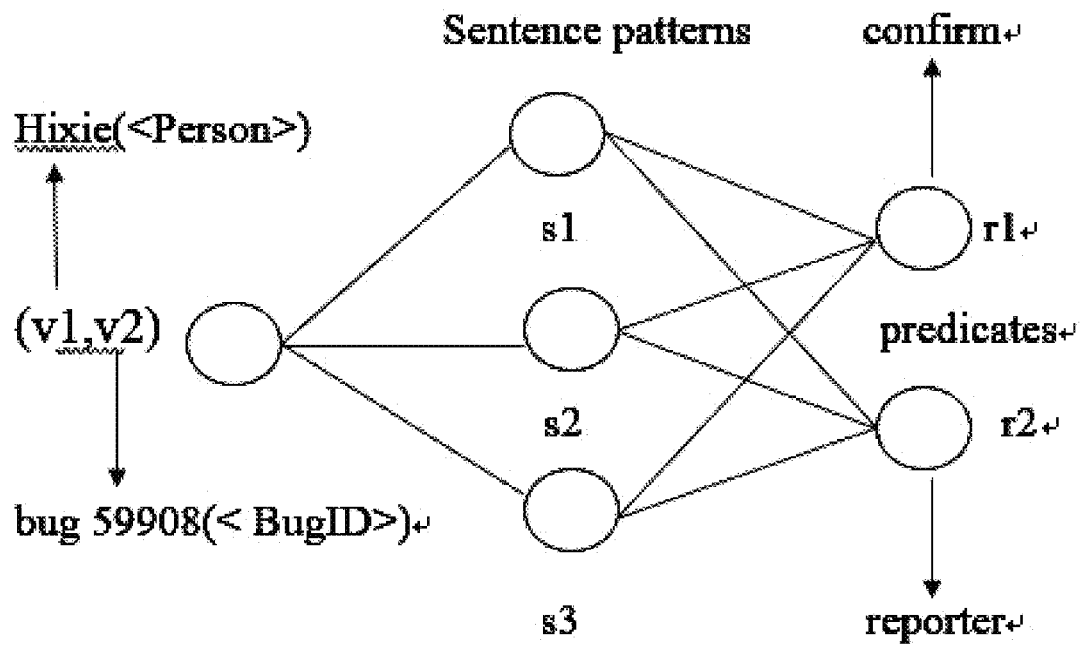
FIG. 3 is a pattern tripartite graph consisting of supported instances, natural language patterns, and predicates according to an embodiment of the present disclosure.

(2) In the present embodiment, a pattern tripartite graph consisting of a supported instance set I, a natural language pattern set S, and a predicate set R is constructed as shown in FIG. 3.

(3) A query template corresponding to each natural language pattern in the natural language pattern set S is acquired according to the natural language pattern set S and an entity relationship triple. In the embodiment, for the natural language pattern, Hixie (<Person>) reported the bug 59908(<BugID>), two question patterns are acquired from entities in the natural language pattern:

Who did report the bug 59908(<BugID>)?

Which bug did Hixie(<Person>) report?

The SPARQL query pattern corresponding to the first question pattern is as follows:
SELECT?Person WHERE
{?Person,type,Person.bug59908,type,BugID.?Person,report,bug 59908}

The SPARQL query pattern corresponding to the second question pattern is as follows:
SELECT?BugID WHERE
{Hixie,type,Person.?BugID,type,BugID. Hixie,report, ?BugID}.

(4) For a question q proposed by a user, an entity in q is identified, and the entity in q is replaced with an entity type to acquire a question q'. In the embodiment it is assumed that the question q proposed by the user is "Who did report the bug 59908?", so that the corresponding question q' is "Who did report the <BugID>?".

(5) A candidate query pattern of the question q is acquired according to the entity type in the question q' acquired in step 4 and an entity type in the natural language pattern set S acquired in step 1, and a similarity between each candidate query pattern and q' is calculated.

(6) A SPARQL query pattern λ(q) of the question q is acquired in combination of a SPARQL query language and according to the similarity between the candidate query pattern and q' acquired in step 5 and the entity in the question q. In the embodiment, the candidate query pattern corresponding to a maximum similarity value is (<Person>) reported the bug 59908(<BugID>), and the obtained SPARQL query pattern λ(q) of the question q is as follows:
SELECT?Person WHERE
{?Person,type,Person.bug59908,type,BugID.?Person,report,bug 59908)

(7) An entity relationship diagram G is constructed from the bug report, and λ(q) acquired by executing the step 6 is searched in the diagram G so as to acquire an answer to the question q. The answer to the question q is shown in Table 1 below.

TABLE 1

| SPARQL query results | |
|---|---|
| 1 | Person |
| 2 | Hixie |

The method of the present disclosure uses a template to understand a natural language question, and uses template-based search and matching based on types, which greatly reduces search space, and improves the efficiency of automatic software bug question and answer. Therefore, software developers and maintainers are helped to find the software bug information they need more quickly, more accurately and more intuitively, so as to fix the corresponding software bug.

What is claimed is:
1. A template-based automatic question and answer method for software bug, comprising:
   step 1: extracting, from a bug report, an entity relationship triple set E, and acquiring, according to the entity relationship triple set E, a natural language pattern set S, a supported instance set I, and a predicate set R;
   step 2: constructing a pattern tripartite graph consisting of the supported instance set I, the natural language pattern set S and the predicate set R acquired in step 1, and determining, according to the pattern tripartite graph in combination with a similarity measurement method, an entity relationship in the entity relationship triple set E;
   step 3: acquiring, according to the natural language pattern set S and an entity relationship triple, a query template corresponding to each natural language pattern in the natural language pattern set S;

step 4: identifying an entity in a question q proposed by a user, and replacing the entity in q with an entity type to obtain a question q';

step 5: acquiring, according to an entity type in the question q' acquired in step 4 and an entity type in the natural language pattern set S acquired in step 1, candidate query patterns for the question q, and calculating a similarity between each candidate query pattern and the question q';

step 6: acquiring, in combination with a SPARQL query language and according to the query template acquired in step 3, the similarity between the each candidate query pattern and q' acquired in step 5 and the entity in the question q, a SPARQL query pattern λ(q) of the question q; and step 7: constructing an entity relationship diagram G from the bug report, and searching in the diagram G for the λ(q) acquired by executing step 6, so as to obtain an answer to the question q;

wherein the constructing a pattern tripartite graph consisting of the supported instance set I, the natural language pattern set S, and the predicate set R acquired in step 1, and determining, according to the pattern tripartite graph in combination with a similarity measurement method, an entity relationship in the entity relationship triple set E in step 2 comprises:

calculating, according to the pattern tripartite graph and in combination with a similarity measurement method, and for each element s in the natural language pattern set S, a similarity between the each element s and each element r in R, and configuring r corresponding to a maximum similarity value as an entity relationship of s, wherein a set formed by all of entity relationships is the entity relationship in the entity relationship triple set E.

2. The template-based automatic question and answer method for software bug according to claim 1, wherein extracting, from the bug report, the entity relationship triple set E, and acquiring, according to the entity relationship triple set E, the natural language pattern set S, the supported instance set I and the predicate set R in step 1, comprises:

in step 1-1: extracting bug attribute information from the bug report to form a bug text corpus D, and extracting the entity relationship triple set E in D;

step 1-2: for each entity relationship triple e in the entity relationship triple set E, extracting candidate mention satisfying the each entity relationship triple e from D; wherein the candidate mention is: a sentence set simultaneously containing two entities of the each entity relationship triple e in the text corpus D; wherein $$e=<v_1,r,v_2>\in E$$

$v_1$ denotes an entity, $v_2$ denotes an entity, and r denotes a relationship;

step 1-3: replacing entities in the candidate mention acquired in step 1-2 with entity types corresponding to the entities so as to acquire a natural language pattern corresponding to the each entity relationship triple e, wherein all of natural language patterns form the natural language pattern set S; and an entity refers to a description of a bug attribute, and an entity type refers to a bug attribute; and step 1-4: all of entities and entity relationships in the text corpus D forming the supported instance set I, and all of predicates forming the predicate set R; wherein an entity relationship comprises a succession relationship and a repetition relationship and is embodied by a predicate.

3. The template-based automatic question and answer method for software bug according to claim 2, wherein the bug attribute information described in step 1-1 comprises: BugID information, Product information, Component information, Reported information, Modified information, Assignee information, Reporter information, QA Contact information, Summary information, and Description information.

4. The template-based automatic question and answer method for software bug according to claim 3, wherein the constructing a pattern tripartite graph consisting of the supported instance set I, the natural language pattern set S and the predicate set R acquired in step 1, and determining, according to the pattern tripartite graph in combination with a similarity measurement method, an entity relationship in the entity relationship triple set E in step 2 further comprises:

step 2-1: the constructing a pattern tripartite graph consisting of the supported instance set I, the natural language pattern set S and the predicate set R, the constructing the pattern tripartite graph comprising: for any natural language pattern s that satisfies s e S, in a case where $(v_1, v_2)$ being a supported instance of s exists, an edge between $(v_1, v_2)$ and s exists; and for any predicate r that satisfies r E R, in a case where r being a relationship between two entities in the supported instance of the natural language pattern s exists, an edge exists between s and r.

5. The template-based automatic question and answer method for software bug according to claim 3, wherein acquiring, according to the natural language pattern set S and the entity relationship triple, the query template corresponding to the each natural language pattern in the natural language pattern set S in step 3 comprises:

for the each natural language pattern in the natural language pattern set S, step 3-1: determining, according to an entity type of the each natural language pattern, a question word wh- corresponding to each entity;

step 3-2: determining, according to the question word determined in step 3-1, how to process a corresponding entity; wherein in a case where the determined question word is which, the entity type is moved after which; otherwise, the entity type is deleted;

step 3-3: adding, according to a main body in a sentence corresponding to the each natural language pattern, an auxiliary verb or a modal verb so as to acquire a complete question sentence marked as a question pattern; and step 3-4: parameterizing the entity relationship triple $<v_1, r, v_2>$, and generating, by using the SPARQL query language, the SPARQL query pattern, namely the query template corresponding to the each natural language pattern, from the question pattern and the parameterized entity relationship triple.

6. The template-based automatic question and answer method for software bug according to claim 5, wherein parameterizing the entity relationship triple $<v_1, r, v_2>$ in step 3-4 comprises: replacing an entity in the triple with an entity type.

7. The template-based automatic question and answer method for software bug according to claim 6, wherein identifying the entity in the question q proposed by the user in step 4 comprises: identifying the entity based on the entity type and by using a long short-term memory (LSTM) neural network.

8. The template-based automatic question and answer method for software bug according to claim 7, wherein acquiring, according to the entity type in the question q' acquire in step 4 and the entity type in the natural language pattern set S acquired in step 1, the candidate query pattern of the question q, and calculating the similarity between the each candidate query pattern and the question q' in step 5 comprises:

step 5-1: determining whether a bijection relationship exists between the entity type in the question q' and an entity type in a natural language pattern in the natural language pattern set S, wherein in a case where the bijective relation exists, the natural language pattern is one candidate query pattern of the question q; and step 5-2: for all candidate query patterns of the question q, calculating the similarity between the each candidate query pattern and q' by using a Jaccard similarity coefficient.

9. The template-based automatic question and answer method for software bug according to claim 8, wherein in step 6, acquiring, in combination with the SPARQL query language and according to the query template acquired in step 3, the similarity between the each candidate query pattern and q' acquired in step 5 and the entity in the question q, the SPARQL query pattern $\lambda(q)$ of the question q comprises:

step 6-1: putting values of similarities between candidate query patterns and the question q' acquired in step 5 in descending order, and selecting a query template of a candidate query pattern corresponding to a maximum similarity; and step 6-2: instantiating, through the entity in the question q, the SPARQL query pattern, and acquiring, in combination with the query template selected in step 6-1, the SPARQL query pattern $\lambda(q)$ corresponding to the question q.

10. The template-based automatic question and answer method for software bug according to claim 3, wherein constructing the entity relationship diagram G based the bug report in step 7 comprises: constructing the entity relationship diagram G through the text corpus D.

* * * * *